(12) United States Patent
Nishikawa

(10) Patent No.: US 6,173,081 B1
(45) Date of Patent: *Jan. 9, 2001

(54) IMAGE PROCESSING METHOD AND APPARATUS WITH VARIATION OF ERROR AMOUNT FOR ERROR DIFFUSION

(75) Inventor: Naoyuki Nishikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/677,444

(22) Filed: Jul. 2, 1996

(30) Foreign Application Priority Data

Jul. 7, 1995 (JP) .................................... 7-172083

(51) Int. Cl.$^7$ ...................................... G06K 9/36
(52) U.S. Cl. .......................... 382/252; 358/466
(58) Field of Search .................... 382/253, 252, 382/456, 521, 457; 358/456, 457, 521

(56) References Cited

U.S. PATENT DOCUMENTS

| | | | |
|---|---|---|---|
| 4,876,610 | 10/1989 | Ohsawa et al. | 358/443 |
| 4,878,125 | 10/1989 | Katayama et al. | 358/443 |
| 4,958,238 | 9/1990 | Katayama et al. | 358/456 |
| 5,068,746 | 11/1991 | Ohsawa et al. | 358/443 |
| 5,150,429 | * 9/1992 | Miller et al. | 382/252 |
| 5,577,136 | * 11/1996 | Tanioka et al. | 382/252 |

OTHER PUBLICATIONS

Floyd and Steinberg, "An Adaptive Algorithm for Spatial Gray Scale", Society for Information Display 1975 Symposium Digest of Technical Papers, 1975, pp. 36–37.

Hongu et al, "Data Compression of Halftone Images by Periodic Error Diffusion Method", NEC Research & Develop. v32 n2, Apr. 1992, p. 237–245.*

Ulichney, "Dithering with Blue Noise", Proceedings of the IEEE, v76, No. 1, Jan. 1988, p 56 & 63.*

Zhigang Fan et al, "Limit Cycle Behavior of Error Diffusion", IEEE International Conference on Image Process. Part 2, 1994.*

Ping Wah Wong, "Error Diffusion with Dynamic Adjusted Kernel", IEEE International Conference on Aconstics, Speech & Signal Process. Part 5, 1994.*

* cited by examiner

Primary Examiner—Amelia Au
Assistant Examiner—Samir Ahmed
(74) Attorney, Agent, or Firm—Fitzpatrick, Cella, Harper & Scinto

(57) ABSTRACT

An image processing apparatus including an input unit for inputting multi-valued input image data, a quantization unit for quantizing the input image data input by the input unit into output image data having a number of levels which is smaller than that of the input image data, and a correction unit for correcting a quantization error which occurs during a quantization process of the quantization unit, the correction unit correcting the quantization error by diffusing an error amount into input image data which have not yet been quantized by the quantization unit, wherein the correction unit periodically varies the error amount to be diffused into the input image data within a range of values up to and including the quantization error.

44 Claims, 12 Drawing Sheets

— BLOCK LINE (EVEN NUMBER)
------ BLOCK LINE (ODD NUMBER)

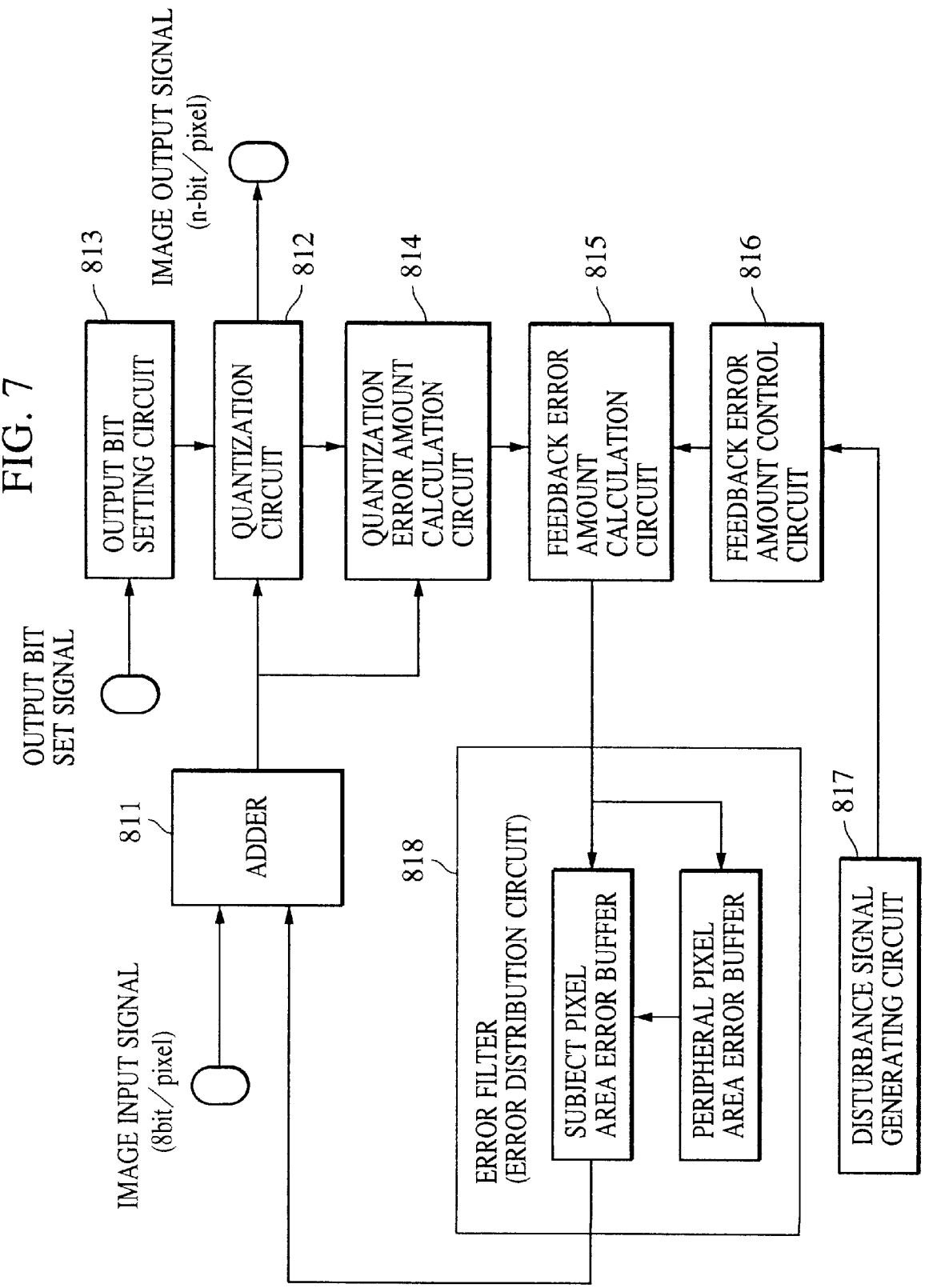

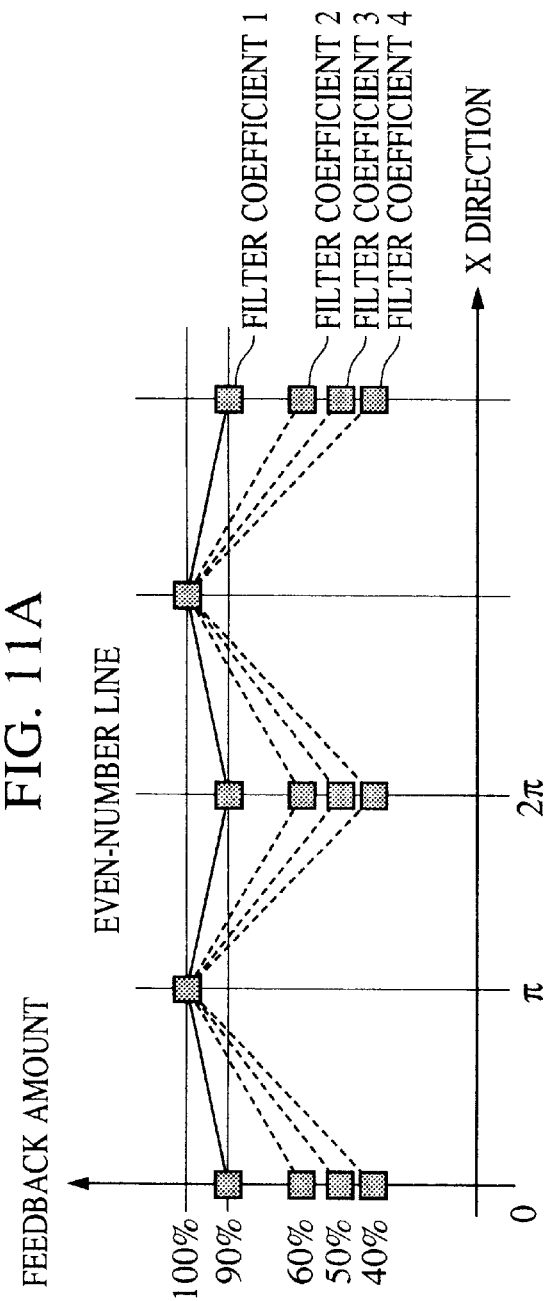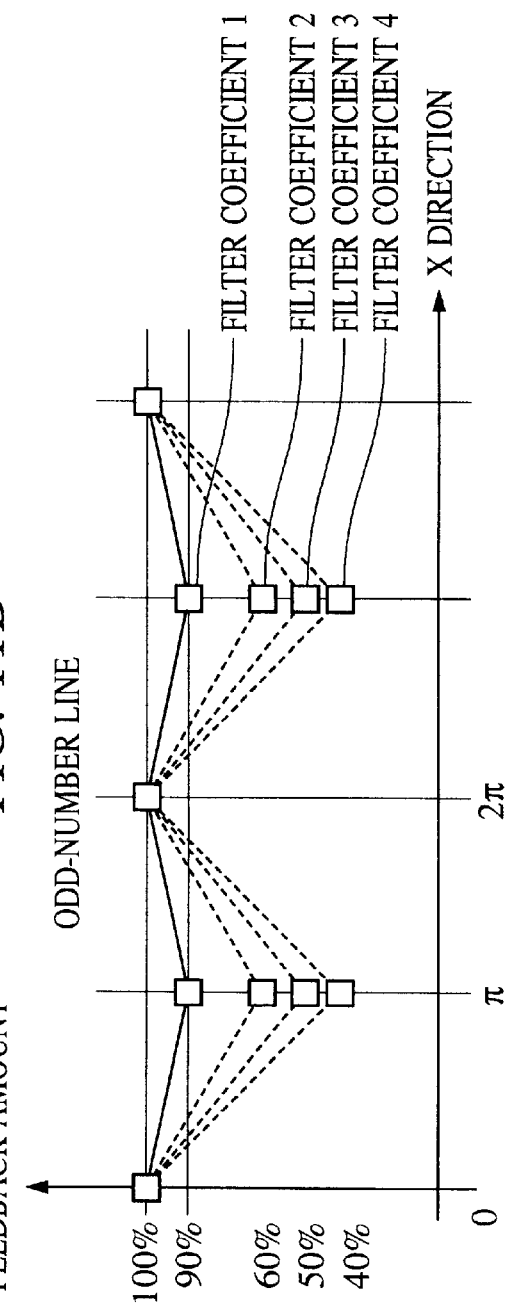

IMAGE PROCESSING METHOD AND APPARATUS WITH VARIATION OF ERROR AMOUNT FOR ERROR DIFFUSION

BACKGROUND OF THE INVENTION

1. Field of the Invention

The present invention relates to an image processing method and apparatus for quantizing a multi-valued image into a binary image, a four-valued image or the like.

2. Description of the Related Art

Hitherto, an image processing apparatus of the foregoing type, such as, for example, a color ink jet printer, inputs data formed of a multi-valued RGB data or the like via an interface, and converts the input data from RGB values to YMCK values by color conversion processing within the printer. Furthermore, the YMCK multi-valued data is converted into final binary drawing data by a binary process provided within the printer.

Since a color ink jet printer having the above-described construction is a binary display unit which is incapable of controlling the density for each pixel, an error diffusion method is generally widely used as a binarization method in order to reproduce a gradation image.

The first algorithm of the error diffusion method was introduced by Floyd and Steinberg in 1975 ("An Adaptive Algorithm for Spatial Gray Scale" in Society for Information Display 1975 Symposium Digest of Technical Papers, 1975, pp. 36–37). This method globally makes a compensation for a local error by comparing input data with a threshold value for each scanning pixel, and by feeding back an error which arises from the binarized results to the peripheral pixels which have not been processed.

FIG. 12 is a schematic block diagram illustrating the structure of a binarization process by an error diffusion method. As is shown in the figure, an adder 11 inputs an image input signal and a quantization error from an error filter 14, and outputs an addition result value after both of the input values are added to each other as its internal process (here, for the sake of convenience, the definition areas of the image input signal are assumed to be 0 and 1).

A binarization processor 12 inputs the addition result value, compares the value with a predetermined threshold value (here, assumed to be ½) as its internal process, and outputs, as an image output signal, "1" when the addition result value is greater than the threshold value and "0" when otherwise.

A quantization error calculation means 13 inputs the addition result value and the image output signal, calculates the difference between them as its internal process, and outputs a quantization error amount.

An error filter 14 inputs the quantization error amount, calculates the error amount corresponding to the amount of the addition of the next pixel after the quantization error amount is multiplied by a peripheral distribution ratio of the error amount, and feeds back this amount to the adder 11.

This error diffusion method, as compared with a dither matrix method, has an excellent feature in that the resolution of a reproduced image is higher.

However, in a binarization method employing an error diffusion method, there are problems: for example, geometrical interference fringes occur in a specific density area due to the influence of the frequency characteristic possessed by the system itself, causing the image quality to deteriorate considerably. This phenomenon is caused by the fact that the error diffusion system is itself formed of a closed loop structure, and this cannot be prevented because the error diffusion method itself is configured to surely distribute an error caused in each pixel to the peripheral pixels (e.g., via a peripheral distribution ratio as discussed above). As a main factor which determines the characteristics of such an error diffusion system, the characteristics of the error filter can be cited. These characteristics are a main factor which determines the pattern in which the geometrical interference fringes occur.

For this reason, some proposals have hitherto been made for improving the error filter. However, no method for providing a radical solution to such problems has yet been found in any of the proposals. For example, other patterns are used to merely change the generation pattern of the interference fringes, or even if random signals are used to erase the interference fringes, the image contains white-noise.

SUMMARY OF THE INVENTION

The present invention eliminates the drawbacks of the above-described related art. It is an object of the present invention to provide an image processing method and apparatus capable of obtaining a high-quality image by an easy processing method.

It is another object of the present invention to provide an image processing apparatus which is capable of effectively suppressing geometrical interference fringes which occur by a conventional error diffusion method by periodically varying an error amount to be diffused within a range of values up to and including the error amount which is generated by a quantization process in an error diffusion process.

To achieve the above-described objects, there is provided an image processing apparatus, comprising: input means for inputting multi-valued image data; quantization means for quantizing the input image data into output image data whose number of levels is smaller than that of the input image data; and correction means for correcting a quantization error which occurs during the quantization process by the quantization means by diffusing the error into image data which have not been quantized, wherein the correction means periodically varies the error amount to be diffused within a range of values up to and including the error amount which has occurred by the quantization process.

It is a further object of the present invention to provide an image processing method and apparatus which is capable of achieving uniform formation of dots which are formed by error diffusion, by periodically varying the error amount which occurs locally by quantization by means of a feedback amount control section and by shifting the phase of the error amount by a half-period, and which is thus capable of effectively suppressing an occurrence of geometrical interference fringes.

It is a still further object of the present invention to provide an image processing method and apparatus which is capable of uniformly diffusing an error by periodically varying an error amount which occurs locally by quantization by means of a feedback amount control section and which is thus capable of effectively suppressing an occurrence of geometrical interference fringes, and which is capable of forming a more natural image by suppressing an influence by the period signal itself upon the image by giving the image an overall noise appearance in accordance with a disturbance signal.

In view of the foregoing, in one aspect, the present invention relates to an image processing apparatus comprising input means for inputting multi-valued input image data, quantization means for quantizing the input image data input by the input means into output image data having a number of levels which is smaller than that of the input image data, and correction means for correcting a quantization error which occurs during a quantization process of the quantization means, the correction means correcting the quantization error by diffusing an error amount into input image data which have not yet been quantized by the quantization means, wherein the correction means periodically varies the error amount to be diffused into the input image data within a range of values up to and including the quantization error.

In another aspect, the present invention relates to an image processing method comprising an input step of inputting multi-valued input image data, a quantization step of quantizing the input image data input in the input step into output image data having a number of levels which is smaller than that of the input image data, and a correction step of correcting a quantization error which occurs during the quantization step, the correction step correcting the quantization error by diffusing the quantization error into input image data which have not yet been quantized, wherein the correction step periodically varies an error amount to be diffused into the input image data within a range of values up to and including the quantization error.

In yet another aspect, the present invention relates to an image processing apparatus comprising input means for inputting input image data having a first number of levels, quantization means for quantizing the input image data input by the input means into output image data having a second number of levels which is smaller than the first number of levels, and error calculation means for calculating a quantization error in accordance with a difference between the input image data and the output image data, and error diffusion means for diffusing an error amount into input image data which have not yet been quantized by the quantization means in accordance with the quantization error calculated by the error quantization means, the error diffusion means comprising error amount calculation means for periodically calculating the error amount to be less than the quantization error.

In still another aspect, the present invention relates to an error diffusion correction system, the system comprising quantization means for quantizing a subject pixel of input n-level image data into m-level output image data, wherein n>m, quantization error calculation means for calculating a quantization error arising from a quantization process of the quantization means, adjusting means for periodically adjusting the quantization error calculated by the calculation means prior to diffusion of the quantization error to peripheral pixels of the subject pixel and for outputting an adjusted quantization error, and diffusion means for diffusing the adjusted quantization error output by the adjusting means, the diffusion means comprising means for diffusing the quantization error to peripheral pixels of the subject pixel.

The above and further objects, aspects and novel features of the invention will become more apparent from the following detailed description when read in connection with the accompanying drawings.

BRIEF DESCRIPTION OF THE DRAWINGS

FIG. 7 is a schematic block diagram of a multi-value forming circuit for performing an error diffusion process according to a third embodiment of the present invention;

FIGS. 11A and 11B show a state in which the feedback error amount periodically varies with its phase shifted by a half period for each filter coefficient.

DETAILED DESCRIPTION OF THE PREFERRED EMBODIMENTS

The preferred embodiments of the present invention will be described below in detail with reference to the accompanying drawings.

[First Embodiment]

[Description of a color printer apparatus]

Figure 1:
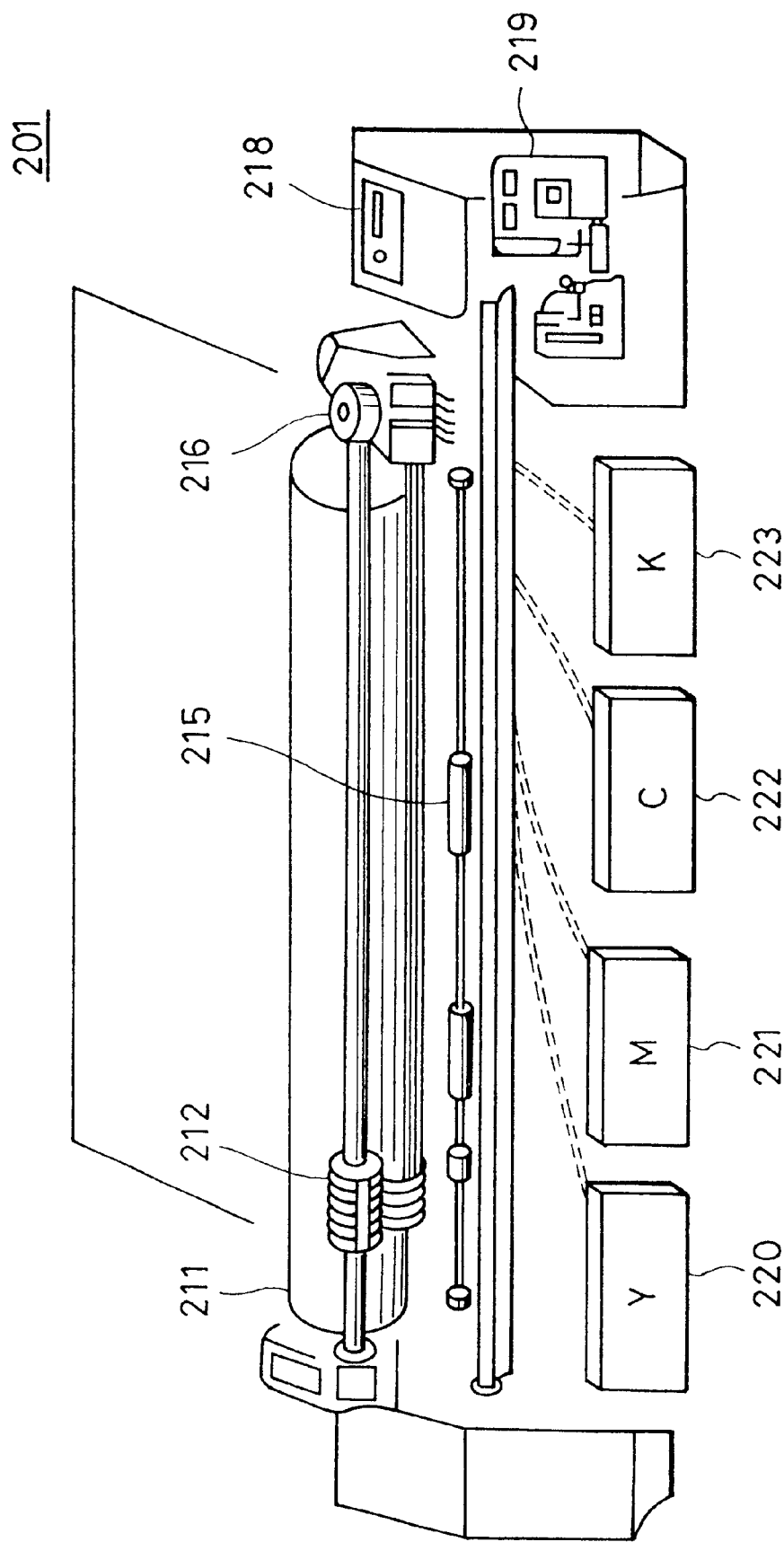
FIG. 1 is an external view of a color ink jet printer according to a first embodiment of the present invention.

FIG. 1 is a schematic view of a color printer apparatus 201, which is an example of an image processing apparatus of this embodiment. Referring to FIG. 1, reference numerals 220 to 223 denote color ink cartridges. The cartridge 220 is filled with a yellow (Y) color ink, the cartridge 221 with a magenta (M) color ink, the cartridge 222 with a cyan (C) color ink, and the cartridge 223 with a black (K) color ink. Mutually independent pipes extend from each ink cartridge and are connected to a pressure pump 216. The respective inks are sent from the pressure pump 216 to a print head 212 at a fixed pressure. Printing paper is fed from the backside of the color printer apparatus 201, and is secured by a paper platen 211 and a front guide roller 215. The color printer apparatus 201 is operated by pressing the key buttons on a control panel 218, and a control board 219 controls the entire operation of the color printer apparatus 201. To make the color printer apparatus 201 perform printing, a print control command and print data are transmitted to the color printer apparatus 201 via an interface (not shown). The control board 219 converts the print data into YMCK data via an internal color processing apparatus when RGB colors are specified by a color specification command (i.e., a print control command), after which the control board 219 drives the print head 212 in order to perform printing. The control board 219 includes a binarization circuit for binarizing multi-valued data transmitted (via the interface) from a host apparatus.

[Description of a binarization process]

Figure 2:
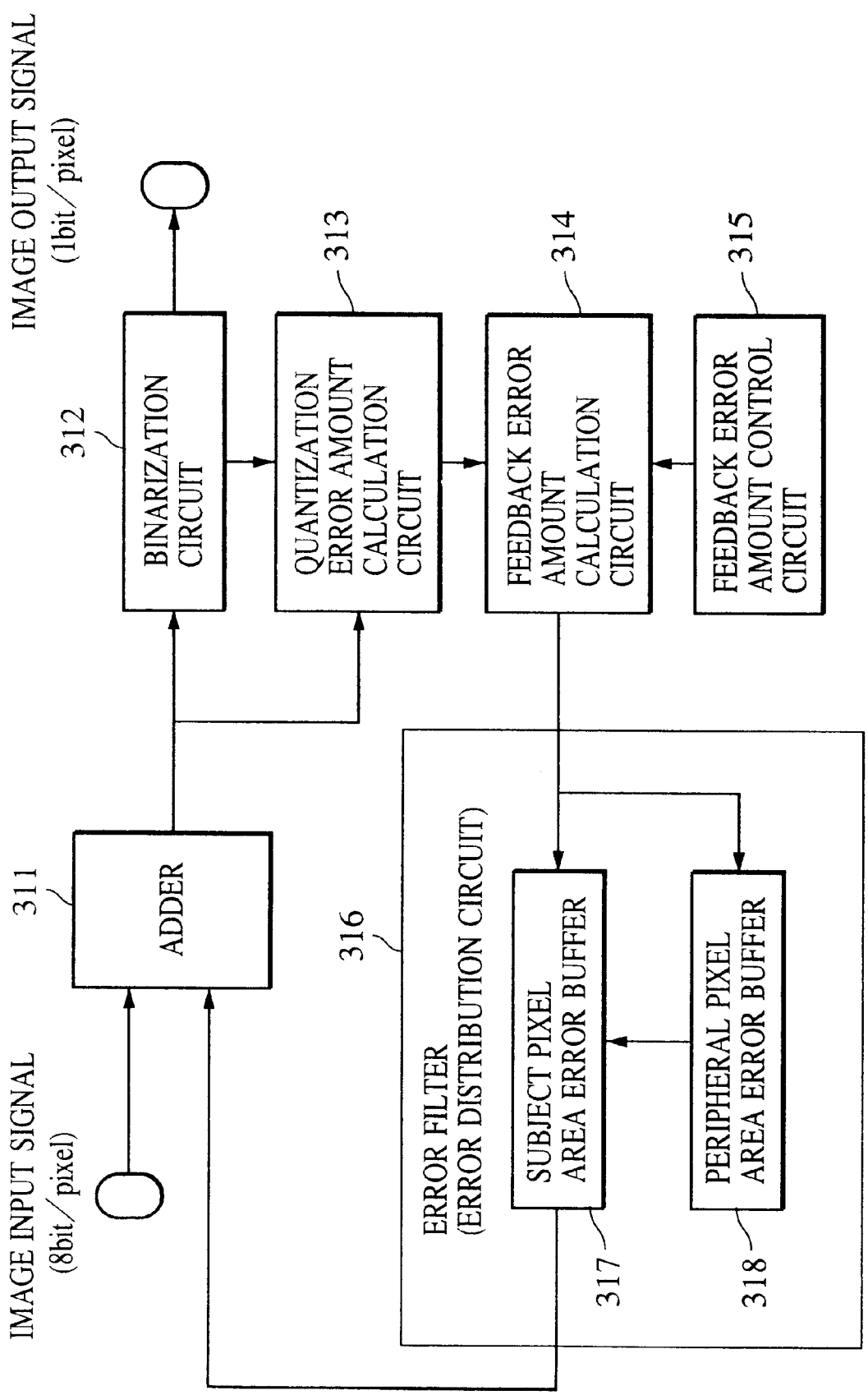
FIG. 2 is a block diagram of a binarization circuit for performing an error diffusion process according to the first embodiment of the present invention.

FIG. 2 is a block diagram of a binarization circuit for performing an error diffusion process in the first embodiment, which binarization circuit is provided in the control board 219 of FIG. 1. The binarization circuit of FIG. 2 converts input data formed of multi-valued 8-bit data into binarized 1-bit output data. Although FIG. 2 shows a processing binarization circuit for one color, circuits for the other colors are formed in the same manner as well. As shown in FIG. 2, an adder 311 inputs an image input signal and a quantized error from an error filter 316, adds these two input values to each other as its internal process, and then outputs an addition result value (here, for the sake of convenience, the definition areas (i.e., the range) of the "image input signal" are assumed to be 0 to 255).

A binarization circuit 312 inputs the addition result value, and compares the value with a predetermined threshold value (e.g., 127) as its internal process. When the addition result value is greater than the threshold value, "255" is output as an image output signal, and otherwise "0" is output. Transmitted to the printer is a 1-bit signal indicating whether the dot should be turned on or off for each pixel.

A quantization error amount calculation circuit 313 inputs the addition result value and the image output signal, calculates the difference between them as its internal process, and then outputs a quantization error amount.

A feedback error amount calculation circuit 314 inputs the quantization error amount, and dynamically varies the error amount to be fed back, for example, from 80% to 100% (of the quantization error amount), as its internal process. The control of this variation amount is appropriately effected by a feedback error amount control circuit 315 located at the lower stage.

An error filter 316 (also referred to as error distribution circuit 316) inputs a quantization error amount from the feedback error amount calculation circuit 314, calculates the error amount to be added to the next pixel by multiplying the quantization error amount by a peripheral distribution ratio as its internal process, and then feeds back this error amount to the adder 311.

The error amount output from the error filter 316 is such that the value of the peripheral pixel area error buffer 318 for storing the error amount which occurs in the quantization of a previous line and the value of the subject pixel area error buffer 317 for storing the error to the adjacent right which occurs in the quantization of the subject pixel are added together. The coefficients of the error filter are $7/16$ with respect to the right side-to-side direction, $3/16$ with respect to the left downward direction, $5/16$ with respect to the downward direction, and $1/16$ with respect to the right downward direction. The subject pixel area error buffer 317 multiplies the error amount from the feedback error amount calculation circuit 314 by $7/16$ and stores it, and the peripheral pixel area error buffer 318 stores the values such that the error amount from the calculation circuit 314 is multiplied by $3/16$, $5/16$, and $1/16$, respectively.

[Control of the feedback error amount]

Figure 3A:
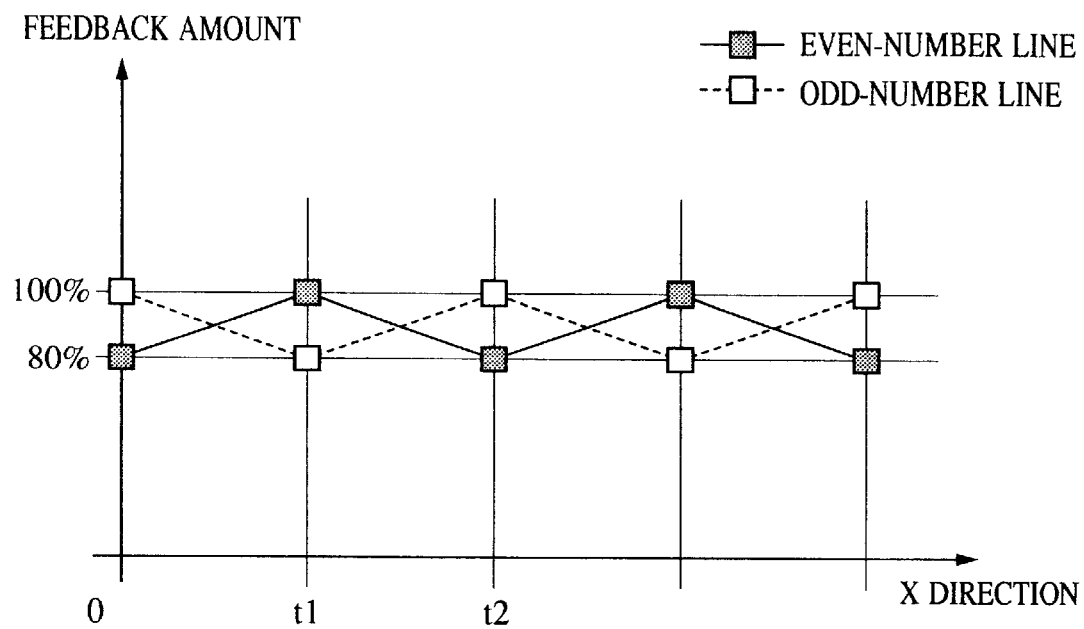
FIGS. 3A and 3B show a state in which a feedback error amount periodically varies in the odd-number and even-number lines with the phase thereof being shifted by a half period between the odd-number lines and the even-number lines according to the first embodiment of the present invention.
Figure 3B:
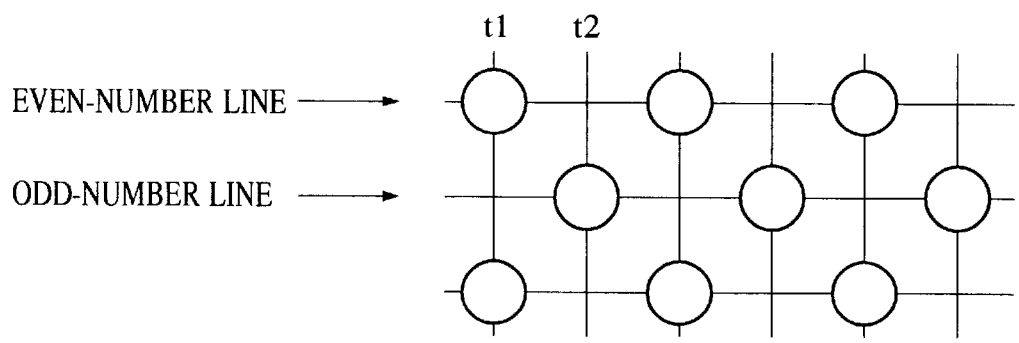
Figure 4A:
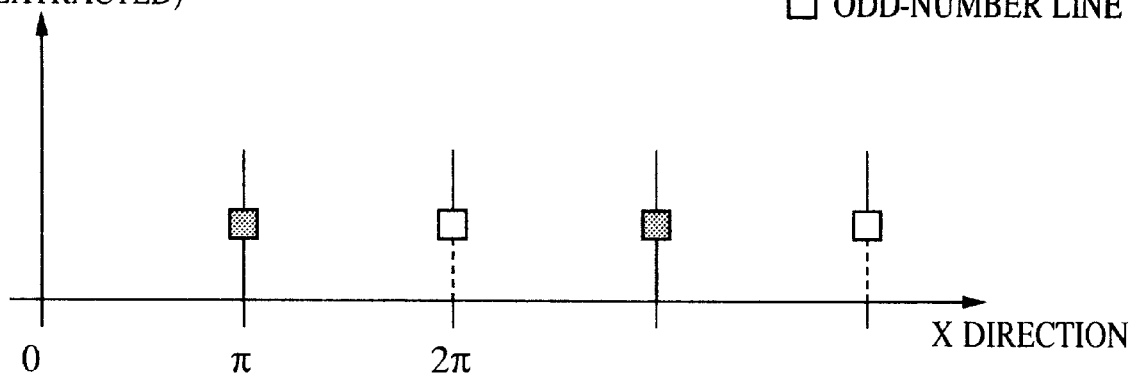
FIGS. 4A and 4B are conceptual views illustrating a state in which a feedback error amount periodically varies in the odd-number and even-number lines with the phase thereof being shifted by a half period between the odd-number lines and the even-number lines, and thus an image is formed in a cross hatch according to the first embodiment of the present invention.
Figure 4B:
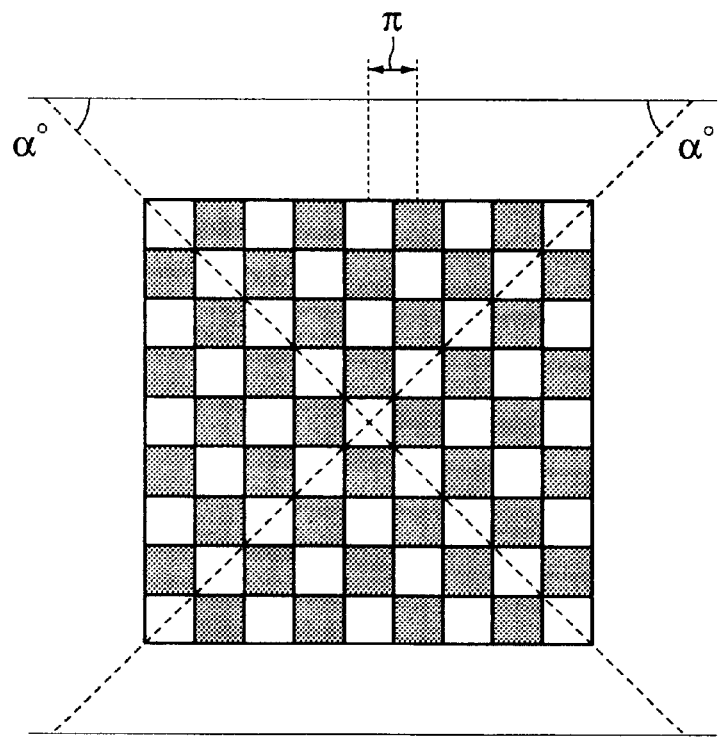

FIGS. 3A and 3B show a process in the feedback error amount control circuit 315. In a conventional error diffusion apparatus, the error amount to be fed back is always constant regardless of the position of a pixel to be processed, and the apparatus is designed to feed back all of the error amount (100%). For example, when using logic circuits, a design is made so as to transmit the error amount as accurately as possible to the peripheral pixels by using a computation apparatus capable of handling a fixed decimal point or the like, a data buffer, and the like. However, in this embodiment of the present invention, the entire amount of the error is not propagated, but an error amount which occurs in correspondence with the pixel position is abandoned (i.e., removed, omitted, or subtracted from the entire error amount) at a fixed cycle. If the phase of the variation of the feedback amount shifts at a fixed cycle with respect to the horizontal scanning direction and by a half period between the odd-number lines and the even-number lines, an image is formed in which the respective dot spacings are uniform and the point arrangement row is inclined, and thus the image quality in the highlighted portion is improved. In the first embodiment, the error amount to be abandoned is 20%, and its cycle is, as shown in FIGS. 3A and 3B, 2*t1 for the even-number lines, and t2 for the odd-number lines. That is, the phase is shifted by a half period between the odd-number lines and the even-number lines. The graph in FIG. 3A shows that each feedback amount alternately varies for each pixel between 80% and 100% along this cycle. Here, by adjusting the change cycle of the feedback amount as shown in FIGS. 4A and 4B, it is possible to adjust the inclination angle $\alpha$ of the dot row. If, for example, $t1=(t2/2)=\pi$, assuming that the spacing between pixels is $\pi$ in the horizontal direction and $\pi$ in the vertical direction, the peak value (the portion of 100%) of the feedback amount forms an inclined arrangement of 45 degrees (in this case, the horizontal resolution of the image to be formed becomes the same as that of the vertical resolution). If $t1=(t2/2)=(\pi/\sqrt{3})$ is set, similarly assuming that the spacing between pixels is $\pi$ in the horizontal direction and $\pi$ in the vertical direction, the peak value of the feedback amount forms an inclined arrangement of 60 degrees (in this case, the horizontal resolution of the image to be formed becomes slightly higher than that of the vertical resolution).

As described above, according to the first embodiment, the formation of dots which are formed by error diffusion can be made uniform by periodically varying the error amount which occurs locally by binarization and by shifting the phase thereof by a half period between the odd-number lines and the even-number lines by means of a feedback amount control circuit, and an occurrence of geometrical interference fringes can be effectively suppressed.

[Second Embodiment]

A preferred second embodiment of the present invention will be described below with reference to the accompanying drawings.

In the first embodiment described earlier, the feedback amount control circuit controls the feedback amount of an error at a predetermined cycle in pixel units, and the cycle thereof is the same between the odd-number lines and the even-number lines and the phase is shifted by a half period. In the second embodiment, an example is described in which the feedback amount is varied in block units rather than in pixel units.

[Description of the binarization process]

The construction of the binarization process in the second embodiment is the same as that in FIG. 2. In this embodiment also, a binarization process for one color will be described.

The adder 311 inputs an image input signal and a quantization error from the error filter 316, adds the two input values as its internal process, and then outputs an addition result value (here, for the sake of convenience, the definition areas (i.e., the range of values) of the image input signal are assumed to be 0 to 255).

The binarization circuit 312 inputs the addition result value, and compares the value with a predetermined threshold value (e.g., 127) as its internal process. When the addition result value is greater than the threshold value, "255" is output as an image output signal, and when otherwise "0" is output. Transmitted to the printer is a 1-bit signal indicating whether the dot should be turned on or off for each pixel.

The quantization error amount calculation circuit 313 inputs the addition result value and the image output signal, calculates the difference between them as its internal process, and then outputs a quantization error amount.

The feedback error amount calculation circuit 314 inputs the quantization error amount, and dynamically varies the error amount to be fed back between 23% and 100% (of the quantization error amount) as its internal process. The control of this variation amount is appropriately effected by the feedback error amount control circuit 315 located at the lower stage.

The error filter 316 inputs a quantization error amount from the feedback error amount calculation circuit 314, calculates the error amount of the addition amount of the next pixel by multiplying the error amount by a peripheral distribution ratio as its internal process, and then feeds back this amount to the adder 311.

The overall processing outline is basically the same as that shown in the schematic block diagram showing the error diffusion process of FIG. 2 described in the first embodiment, but the processing procedure in the feedback error amount control section 315 is different. The control of the feedback error amount will now be described below.

[Control of the feedback error amount]

Figure 5A:
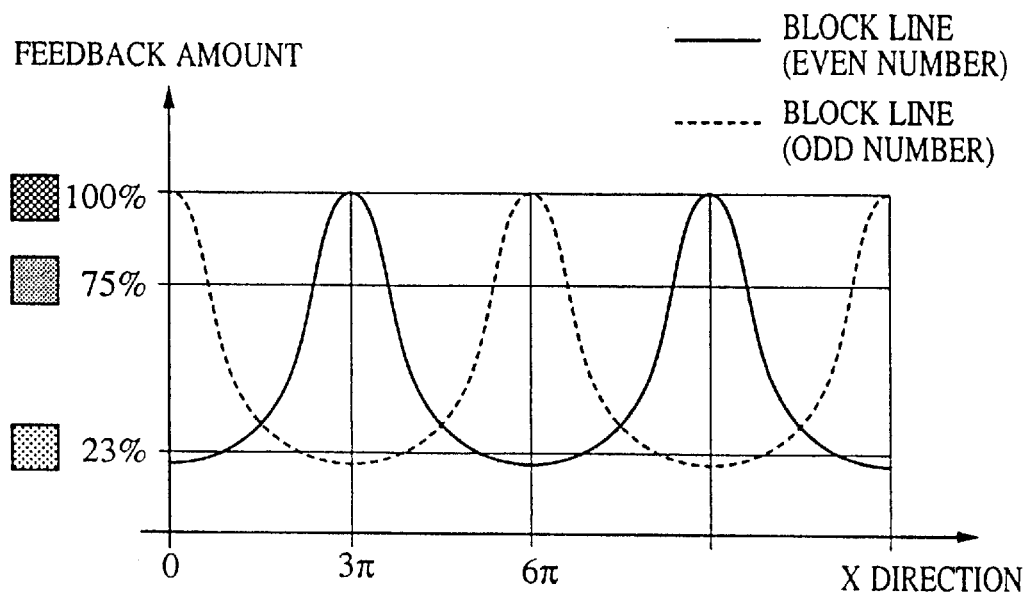
FIGS. 5A, 5B, and 5C show a state in which a feedback error amount periodically varies in the odd-number and even-number block lines with the phase thereof being shifted by a half period between the odd-number block lines and the even-number block lines according to a second embodiment of the present invention.
Figure 5B:
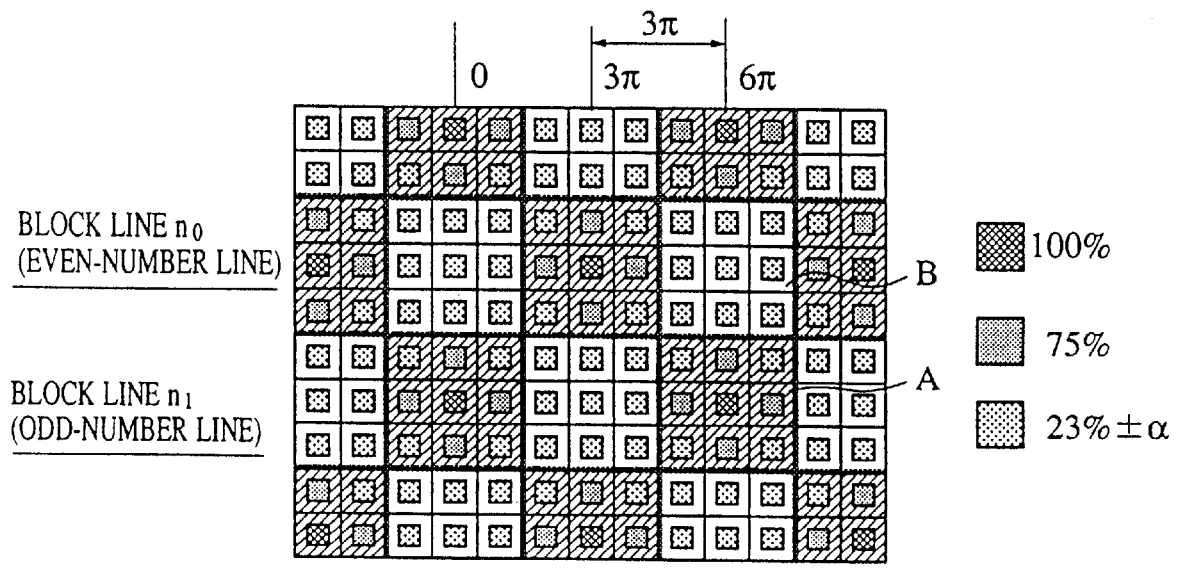
Figure 5C:
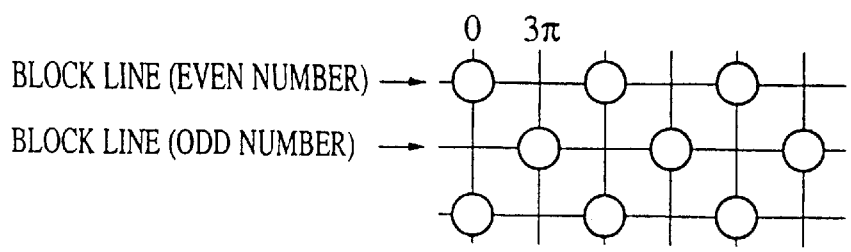

FIGS. 5A, 5B, and 5C show a process in the feedback error amount control circuit 315. In the second embodiment, the error amount which occurs in correspondence with a pixel block position is abandoned at a fixed cycle (here, a pixel block is defined as a 3×3 grouping of pixels, and similarly a block line is defined by a bundle of pixel lines of 3 lines).

If a design is made to make the phase of the variation of the feedback amount different at a fixed cycle with respect to the horizontal scanning direction and by a half period between the odd-number block lines (e.g., odd-number block line $n_1$) and the even-number block lines (e.g., even-number block line $n_0$), an image is formed in which the respective dot spacings are uniform and the point arrangement row is inclined, and thus the image quality in the highlighted portion is improved. In the second embodiment, blocks A and blocks B shown in FIG. 5B are alternately used to control the feedback amount of the error. In the second embodiment, the error amount to be abandoned is 0 to 77%±α. This change cycle, as shown FIGS. 5A, 5B, and 5C, is 6π for both the even-number block lines and the odd-number block lines (here, the cycle of the image (the pixels) is π for the horizontal and vertical directions). The graph in FIG. 5A shows a state in which each feedback amount alternately varies between 23±α and 100% along this cycle. The variation of the feedback amount defined in this embodiment is as shown in the graph. The feedback amount of 23% is the average value of the feedback amount at π, and the value of 23±α% is the difference from the average value. Aside from this, a control function formula defined by a composite function in which a plurality of trigonometric functions are combined may be used to vary the feedback amount. With such an error diffusion process constructed as described above, with respect to an image having a two-dimensional expanse, the error amount to be fed back varies as shown in FIGS. 6A and 6B.

Since an image is a two-dimensional object, periodic feedback amount variations will be added in both the x and y directions independently of each other.

Figure 6A:
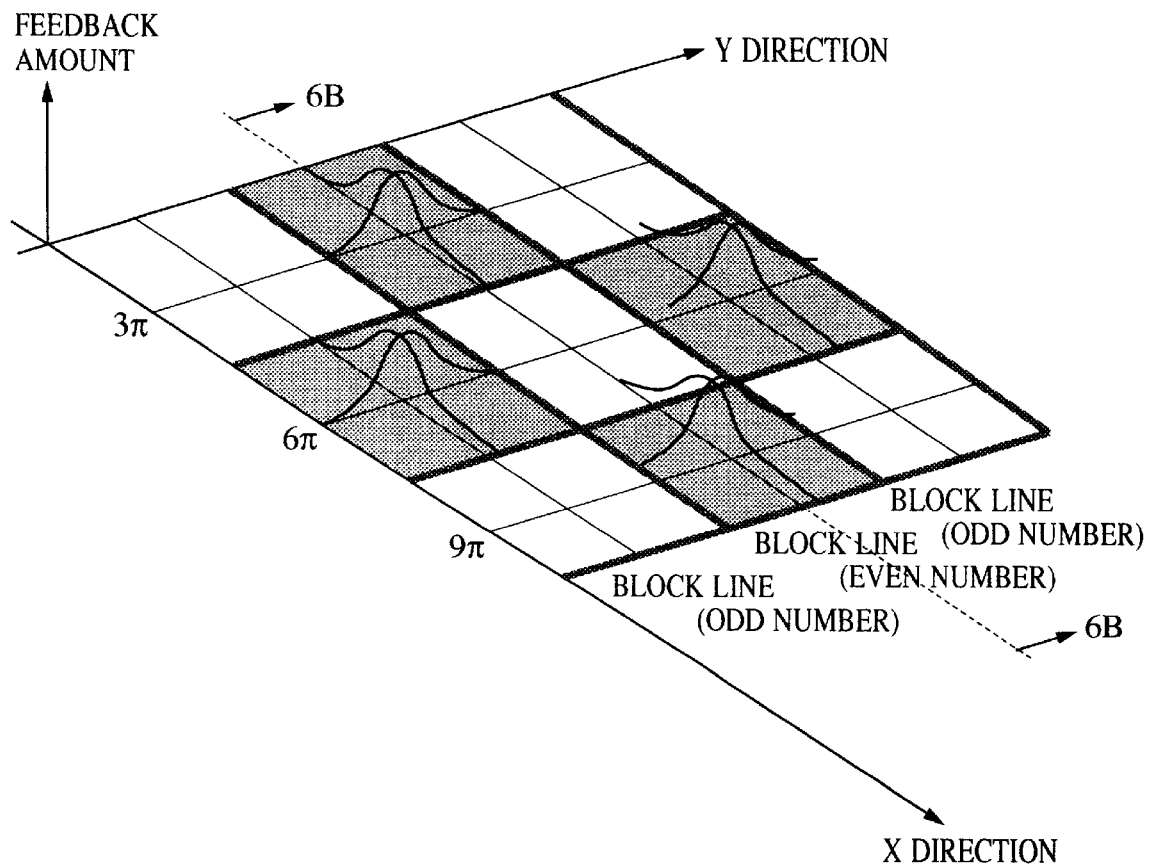
FIGS. 6A and 6B show a state in which the feedback error amount varies periodically and on the plane in the odd-number and even-number block lines with the phase thereof being shifted by a half period between the odd-number block lines and the even-number block lines according to the second embodiment of the present invention (with FIG. 6B being a sectional view of FIG. 6A)
Figure 6B:
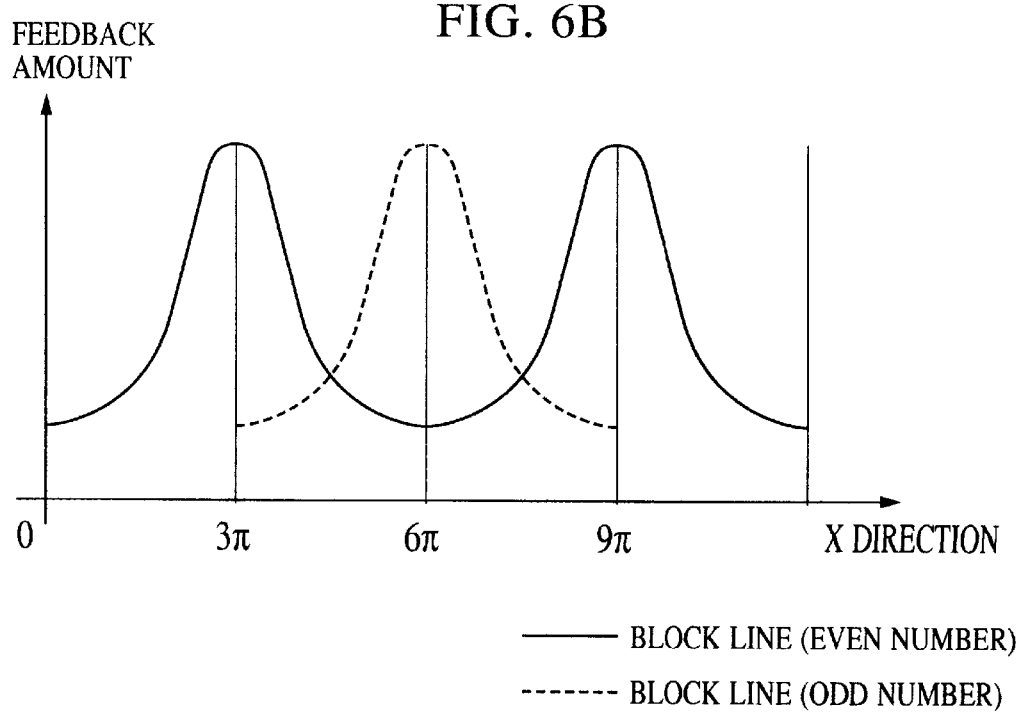

Here, regarding the feedback amount Fxy at a certain pixel (position: x,y), if the feedback amount at x is denoted as fx (varies as shown in FIG. 6B) and the feedback amount at y is denoted as fy (varies similarly to that shown in the graph of FIG. 6B), Fxy=fx·fy, and the feedback amount Fxy varies as shown in FIG. 6A.

[Third Embodiment]

A preferred third embodiment of the present invention will be described below with reference to the accompanying drawings.

In the first embodiment described earlier, an apparatus for binarizing (1 bit/pixel) a multi-valued signal is described, and the feedback amount control circuit changes the period in pixel units, the change period being the same between the odd-number lines and the even-number lines and the phase being shifted by a half period.

In the third embodiment, a multi-value forming apparatus such as, for example, an apparatus capable of recording one pixel at a plurality of recording levels by varying the dot size, is extended further so as to feed a disturbance signal to the feedback amount.

[Description of a multi-value forming process]

FIG. 7 is a block diagram showing an error diffusion process in the third embodiment, and also shows a state in which input data formed of multi-valued 8-bit data is converted into an n-bit (n≧2 integer) output data. The circuit of FIG. 7 is a circuit for one color. However, by providing the same circuits for a plurality of colors, a full-color image can be formed. As shown in FIG. 7, an adder 811 inputs an image input signal and a quantization error from an error filter 818, adds the two input values as its internal process, and then outputs an addition result value (here, for the sake of convenience, the definition areas (i.e., the range of values) of the "image input signal" are assumed to be 0 to 255).

Upon receiving an output bit set signal, an output bit setting circuit 813 specifies (for example, sets so that a 2-bit output is made) the number of bits to be output, to quantization circuit 812.

The quantization circuit 812 inputs the addition result value, compares the value with a predetermined threshold value as its internal process, and then outputs an output value as necessary. For example, in a case in which the number of output bits is 2, a comparison with a predetermined threshold value (here, for example, four predetermined threshold values of 47, 146, 226, and 255 are assumed) is made. When the addition result value is between 0 and 47, "0" is output as an image output signal, when between 48 and 146, "96" is output, when between 147 and 226, "198" is output, and when between 226 and 255, "255" is output.

A quantization error amount calculation circuit 814 inputs the addition result value and the image output signal, calculates the difference between them as its internal process, and then outputs a quantization error amount.

A feedback error amount calculation circuit 815 inputs the quantization error amount, and dynamically varies the error amount to be fed back, for example, from 80%±δ to 100% (of the quantization error amount) as its internal process. The control of this variation amount is appropriately effected by a feedback error amount control circuit 816 located at the lower stage.

The feedback error amount control circuit 816 varies the feedback error amount in a nonperiodic manner by a random number signal fed from a disturbance signal generating circuit 817.

An error filter 818 inputs an output value from the feedback error amount calculation circuit 815, calculates the error amount to be added to the next pixel by multiplying the error amount by the peripheral distribution ratio as its internal process, and then feeds back this amount to the adder 811.

[Control of the feedback error amount]

Figure 8A:
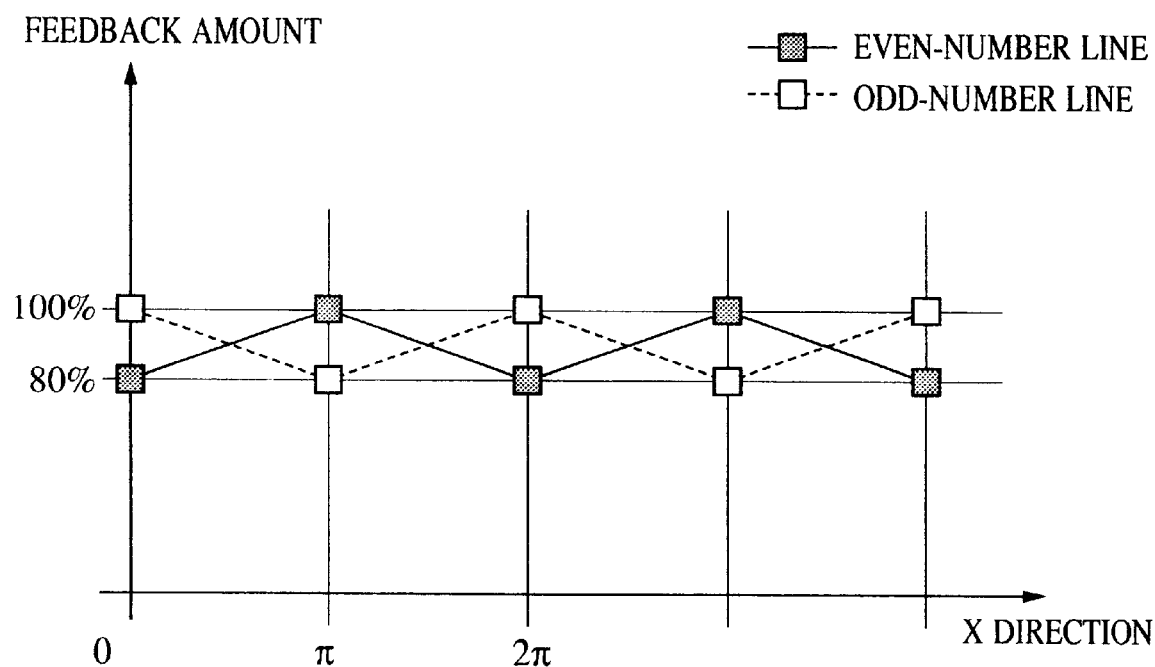
FIGS. 8A and 8B are conceptual views illustrating a state in which a feedback error amount periodically varies in the odd-number and even-number lines with the phase thereof being shifted by a half period between the odd-number lines and the even-number lines, and a disturbance signal based on a random number is fed, thus an image is formed in a cross hatch according to the third embodiment of the present invention.
Figure 8B:
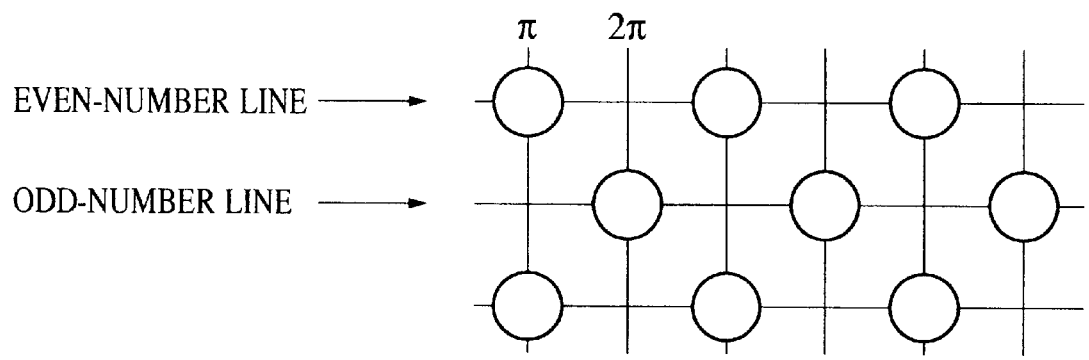

FIGS. 8A and 8B show a process in the feedback error amount calculation circuit 815. In the third embodiment, all of the error amount (i.e., the entire error amount) is not propagated, but an error amount which occurs in correspondence with a pixel position is abandoned at a fixed cycle. If the phase of the variation of the feedback amount shifts at a fixed cycle with respect to the horizontal scanning direction and between the odd-number lines and the even-number lines, an image is formed in which the respective dot spacings are uniform and the point arrangement row is inclined, and thus the image quality in the highlighted portion is improved.

In the third embodiment, the error amount to be abandoned is 20%±δ (δ is an arbitrary value formed by the random signal (i.e., the signal from disturbance signal generating circuit 817)), and its period is 2π for both the even-number lines and the odd-number lines as shown in FIGS. 8A and 8B (the period of the image (pixel to pixel) is π in the horizontal and vertical directions). The graph in FIG. 8A shows that each feedback amount alternately varies for each pixel between 80%±δ and 100% along this cycle.

As described above, according to the third embodiment, the diffusion of the error is made uniform by periodically varying the error amount which occurs locally by binarization by means of a feedback amount control circuit, and an occurrence of geometrical interference fringes can be effectively suppressed. Furthermore, an influence by the period signal itself upon the image is suppressed by giving the image an overall noise appearance in accordance with a disturbance signal, and thus a more natural image can be formed.

Further, the third embodiment is effective for binarizing input multi-valued data into binary data (i.e., 1 bit output data, n=1).

[Fourth Embodiment]

A preferred fourth embodiment of the present invention will be described below with reference to the accompanying drawings.

In the first embodiment described earlier, regarding the feedback error amount to be input to the error filter, the same amount is provided to all filter coefficients of the error filter. However, in the fourth embodiment, the feedback error amounts to be provided for respective filter coefficients are made mutually different.

[Description of the binarization process]

Figure 9:
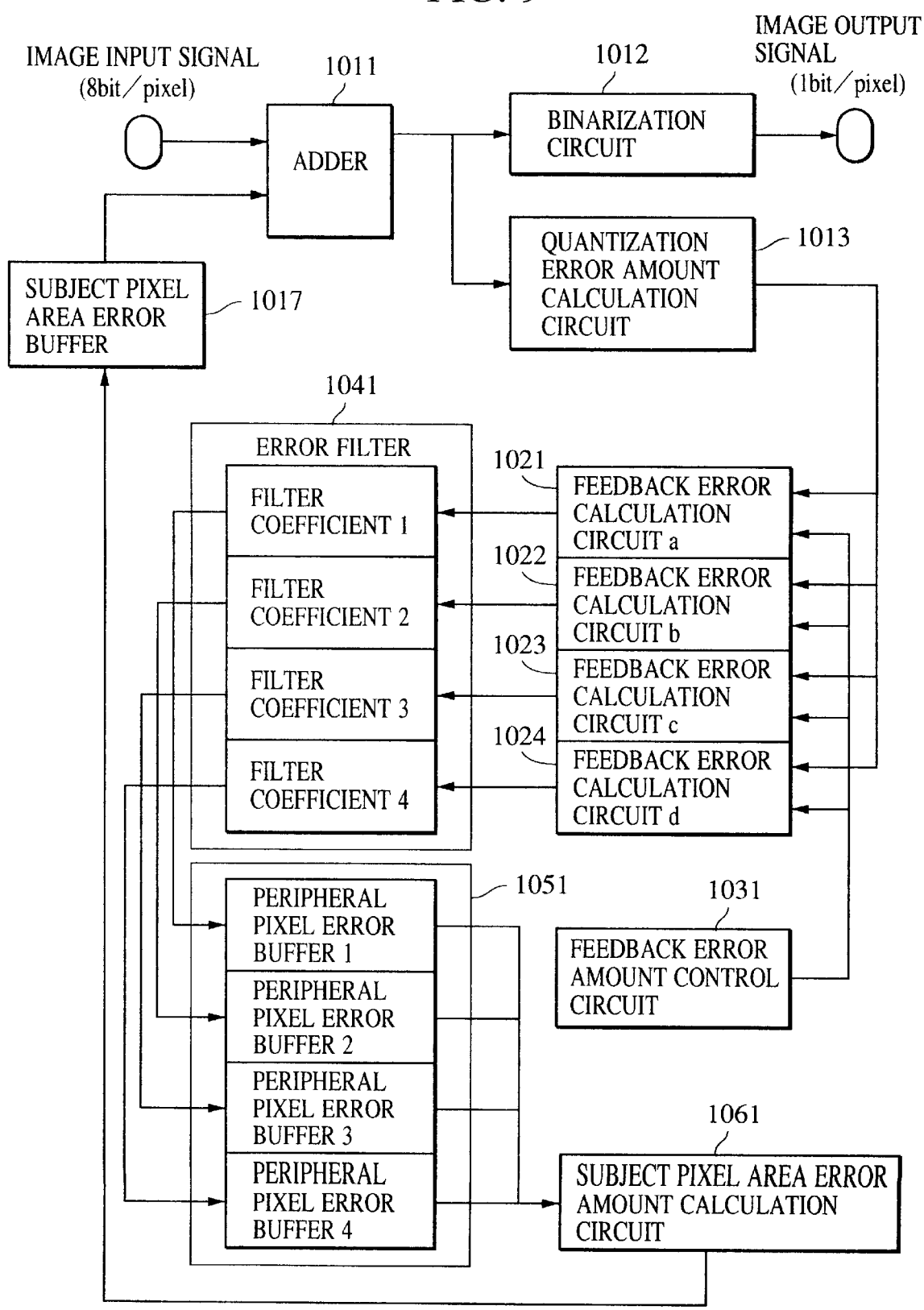
FIG. 9 is a block diagram of a binarization circuit for performing an error diffusion process according to a fourth embodiment of the present invention.

FIG. 9 is a block diagram illustrating an error diffusion process in the fourth embodiment, and also shows a state in which input data formed of multi-valued 8-bit data is converted into a 1-bit output data. FIG. 9 also shows a processing circuit for one color. As shown in FIG. 9, an adder 1011 inputs an image input signal and a quantization error from a subject pixel area error buffer 1017, adds the two input values as its internal process, and then outputs an addition result value (here, for the sake of convenience, the definition areas (i.e., the range of values) of the "image input signal" are assumed to be 0 to 255).

A binarization circuit 1012 inputs the addition result value, and compares the value with a predetermined threshold value (e.g., 127) as its internal process. When the addition result value is greater than the threshold value, "255" is output as an image output signal, and otherwise "0" is output. Transmitted to the printer is a 1-bit signal indicating whether the dot should be turned on or off.

A quantization error amount calculation circuit 1013 inputs the addition result value and the image output signal, calculates the difference between them as its internal process, and then outputs a quantization error amount.

A feedback error amount calculation circuit "a" 1021 inputs the quantization error amount, and dynamically varies the error amount to be fed back from 90% to 100% as its internal process. A feedback error amount calculation circuit "b" 1022 inputs the quantization error amount, and dynamically varies the error amount to be fed back from 40% to 100% as its internal process. A feedback error amount calculation circuit "c" 1023 inputs the quantization error amount, and dynamically varies the error amount to be fed back from 50% to 100% as its internal process. A feedback error amount calculation circuit "d" 1024 inputs the quantization error amount, and dynamically varies the error amount to be fed back from 60% to 100% as its internal process.

The control of all the feedback error amount calculation circuits "a" 1021 to "d" 1024 are appropriately effected by a feedback error amount control circuit 1031 located at the lower stage.

An error filter 1041 inputs the output values from the feedback error amount calculation circuits "a" 1021 to "d" 1024, and temporarily stores the error amount calculated on the basis of the filter coefficients 1 to 4 in a peripheral pixel area error buffer 1051.

The error filter 1041 has four coefficient values stored therein. The error filter 1041 multiplies the output values from the feedback error calculation circuits "a" 1021 to "d" 1034 by filter coefficients 1 to 4, respectively, and outputs the values to the peripheral error filter 1051.

The value of the peripheral pixel error filter 1 from among the outputs of the peripheral error buffer 1051 is added to the error amount from the previous line (not shown) by the subject pixel area error calculation circuit 1061, and is stored in the subject pixel area error buffer 1017.

Each of the error values of the peripheral pixel error buffers 2 to 4 is appropriately added and accumulated in the error buffer (not shown) of the next line in order to distribute the error value to the pixels of the next line.

A subject pixel area error amount calculation circuit 1061 inputs an output value from the peripheral pixel area error buffer 1051, and calculates the error amount to be used as the subject pixel area error amount, after which the subject pixel area error amount calculation circuit 1061 stores the calculated value in a subject pixel area error buffer 1071 which provides the value to the next subject pixel.

[Description of an error filter]

Figure 10:
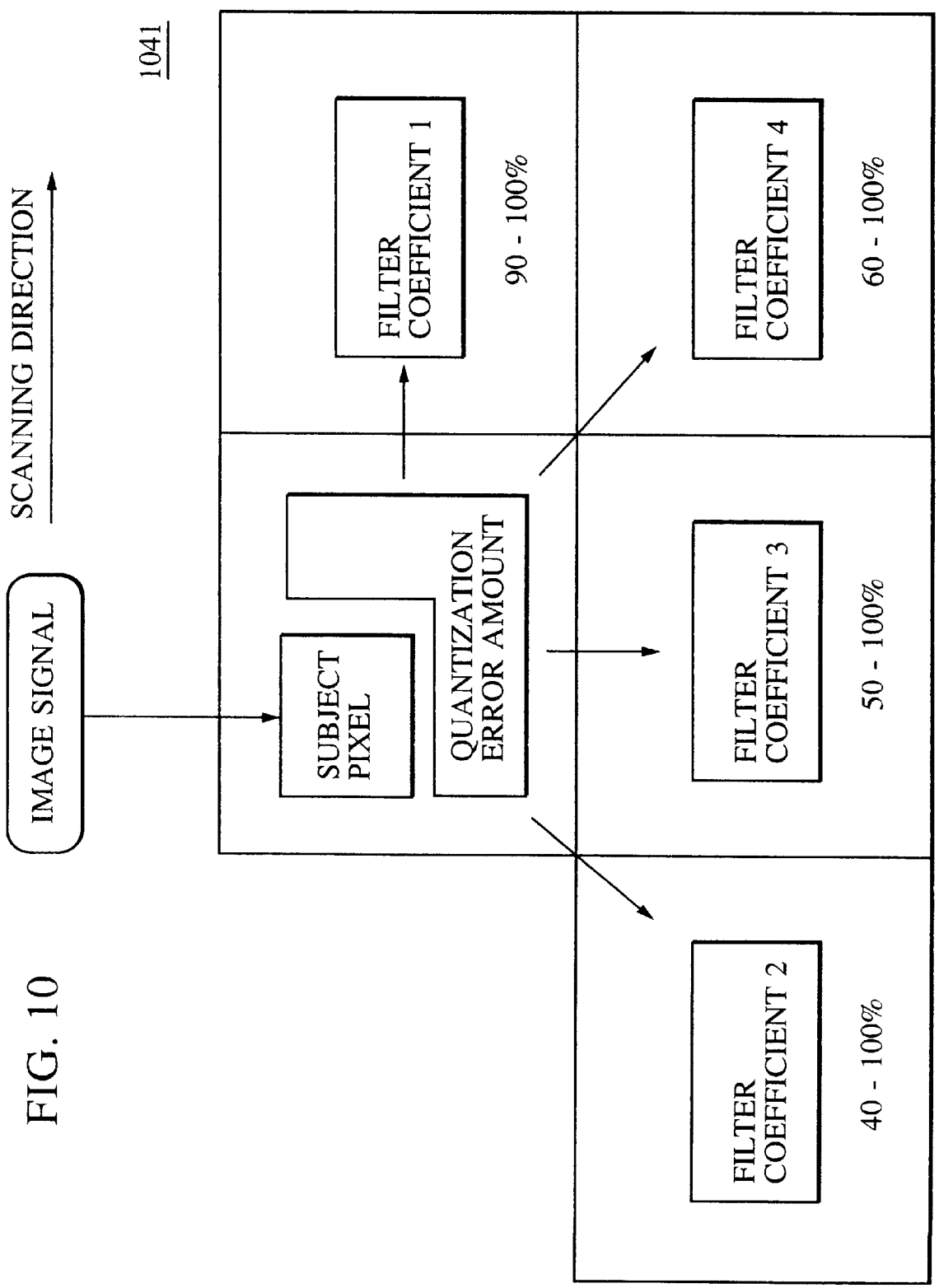
FIG. 10 shows an error diffusion filter according to the fourth embodiment of the present invention.
Figure 12:
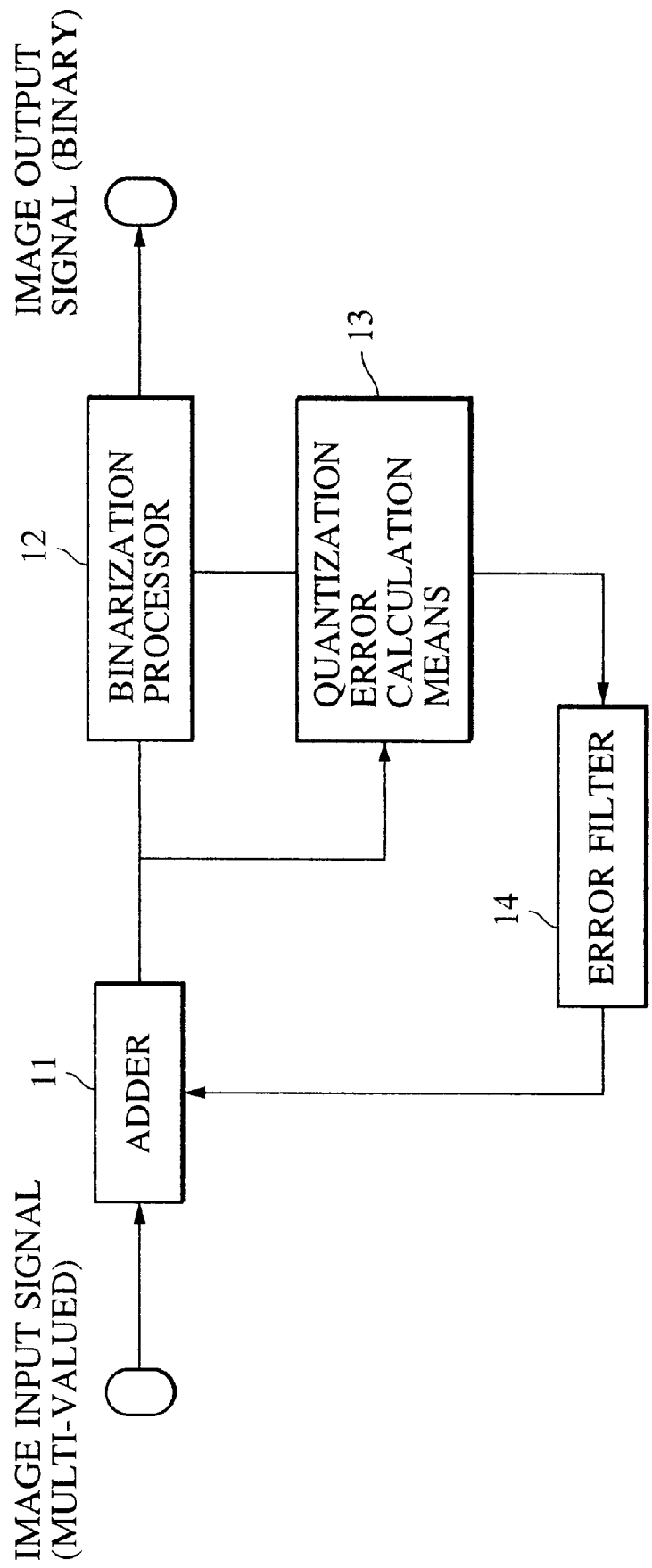
FIG. 12 is a schematic block diagram of an example of the prior art.

FIG. 10 is a block diagram illustrating the construction of an error filter 1041 of the fourth embodiment. The image is scanned from left to right in a horizontal direction, and the image signals are sent out in sequence to an error filter 1041 as a result of the scanning. After the quantization error is calculated in accordance with a procedure shown in FIG. 9, the error amount is allocated to the filter coefficients 1 to 4.

Here, the filter coefficient 1 is a coefficient which determines the amount of diffusion of the error in the horizontal direction in the same line, and in this embodiment, the variation of the error amount to be fed back to the coefficient is assumed to be 90 to 100%. The filter coefficient 2 is a coefficient which determines the amount of diffusion of the error to the left position in a line below the subject pixel, and in this embodiment, the variation of the error amount to be fed back to the coefficient is assumed to be 40 to 100%. The filter coefficient 3 is a coefficient which determines the amount of diffusion of the error to the position in a line below the subject pixel, and in this embodiment, the variation of the error amount to be fed back to the coefficient is assumed to be 50 to 100%. The filter coefficient 4 is a coefficient which determines the amount of diffusion of the error to the right position in a line below the subject pixel, and in this embodiment, the variation of the error amount to be fed back to the coefficient is assumed to be 60 to 100%. In this embodiment, by reducing the variation amount in the filter coefficient 1 to be smaller than the variation amounts of the other coefficients 2 to 4, an improved resolution in the horizontal direction and an improved image quality in the highlighted portion can be expected.

[Control of the feedback error amount]

FIGS. 11A and 11B show the processing outline of the feedback error amount control circuit 1031 of FIG. 9. In the fourth embodiment, all of the error amount (i.e., the entire error amount) is not propagated, but an error amount which occurs in correspondence with the pixel position is abandoned at a fixed cycle. If the phase of the variation of the feedback amount is made different at a fixed cycle with respect to the horizontal scanning direction and between the odd-number lines and the even-number lines, an image is formed in which the respective dot spacings are uniform and the point arrangement row is inclined, and thus the image quality in the highlighted portion is improved.

The error amount to be abandoned in the fourth embodiment is 0 to 10% for the filter coefficient 1, 0 to 60% for the filter coefficient 2, 0 to 50% for the filter coefficient 3, and 0 to 40% for the filter coefficient 4.

The cycle of the error amount, as shown in FIGS. 11A and 11B is $2\pi$ for both the odd-number lines and the even-number lines (the period of the image (pixel to pixel) is $\pi$ in the horizontal direction and in the vertical direction). The graphs in FIGS. 11A and 11B show that each feedback amount alternately varies for each pixel between the maximum value and the minimum value along this cycle in the odd-number lines and in the even-number lines.

As described above, according to the embodiment of the present invention, the diffusion of the error is made uniform by periodically varying the error amount which occurs locally by quantization by means of feedback amount control means, and an occurrence of geometrical interference fringes can be effectively suppressed. Further, an influence by the period signal itself upon the image is suppressed by giving the image an overall noise appearance in accordance with a disturbance signal, and thus a more natural image can be formed.

Although in this embodiment a description is provided by using an ink jet printer as an example, the present invention may be applied to other printers, such as a laser beam printer.

As has been described up to this point, according to the present invention, in an error diffusion process, by periodically varying the error amount to be diffused within a range of values up to and including the error amount which occurs by a quantization process, geometrical interference fringes at a plurality of densities, which occur during the conventional error diffusion process, can be effectively suppressed.

Except as otherwise disclosed herein, the various components shown in outline or in block form in the figures are individually well known and their internal construction and operation are not critical either to the making or using of this invention or to a description of the best mode of the invention.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An image processing apparatus, comprising:

input means for inputting multi-valued image data;

quantization means for quantizing the input image data input by said input means into output image data having a number of levels which is smaller than that of the input image data; and correction means for correcting a quantization error between the input image data and the output image data by diffusing the quantization error to peripheral pixels of a subject pixel, the quantization error resulting from quantization processing by said quantization means and calculated based on the peripheral pixels of a subject pixel area error amount which determines an amount of diffusion of the error according to a position of the subject pixel, said correction means correcting the quantization error by dynamically varying the quantization error amount to be diffused into input image data which has not yet been quantized by said quantization means, wherein said correction means periodically varies the quantized error diffused into the input image data between a range of values from a percentage of the quantization error up to and including 100 percent of the quantization error.

2. An image processing apparatus according to claim 1, wherein said correction means comprises:

calculation means for calculating the quantization error amount to be diffused into the input image data;

control means for controlling said calculation means; and filtering means for performing a filtering process for diffusing the quantization error amount calculated by said calculation means into the peripheral pixels of the subject pixel of the input image data.

3. An image processing apparatus according to claim 2, wherein said control means controls said calculation means so as to dynamically vary the quantization error amount to be diffused into the input image data in accordance with a predetermined periodic function.

4. An image processing apparatus according to claim 3, wherein said control means controls said calculation means so as to dynamically vary the quantization error amount to be diffused into the input image data in accordance with a first predetermined periodic function for odd-number lines of the input image data, and in accordance with a different, second predetermined periodic function for even-number lines of the input image data.

5. An image processing apparatus according to claim 4, wherein the first and second predetermined periodic functions differ by being shifted in phase by a half period from one another.

6. An image processing apparatus according to claim 3, wherein the predetermined periodic function is a composite function of a plurality of trigonometric formulas.

7. An image processing apparatus according to claim 3, wherein said correction means uses a first predetermined periodic function for odd-number blocks of the input image data, and a different, second predetermined periodic function for even-number blocks of the input image data.

8. An image processing apparatus according to claim 7, wherein each said odd-number block and said even-number block comprises a plurality of pixels.

9. An image processing apparatus according to claim 8, wherein each said odd-number block and said even-number block comprises a 3×3 pixel area.

10. An image processing apparatus according to claim 3, wherein said filtering means performs a filtering process on the quantization error amount calculated by said calculation means so as to diffuse the quantization error amount by using a different periodic function for each pixel of a plurality of pixels of the input image data.

11. An image processing apparatus according to claim 2, wherein said control means comprises random number signal generating means for generating a random number signal and means for controlling said calculation means to dynamically vary the quantization error amount to be diffused in accordance with the random number signal from said random number signal generating means.

12. An image processing method, comprising:
   an input step of inputting multi-valued image data;
   a quantization step of quantizing the input image data input in said input step into output image data having a number of levels which is smaller than that of the input image data; and
   a correction step of correcting a quantization error between the input image data and the output image data by diffusing the quantization error to peripheral pixels of a subject pixel, the quantization error resulting from said quantization step and calculated based on the peripheral pixels of a subject pixel area error amount which determines an amount of diffusion of the error according to a position of the subject pixel, said correction step including correcting the quantization error by dynamically varying the quantization error amount to be diffused into input image data which has not yet been quantized,
   wherein said correction step includes periodically varying the quantization error diffused into the input image data between a range of values from a percentage of the quantization error up to and including 100 percent of the quantization error.

13. An image processing method according to claim 12, wherein said correction step comprises:
   a calculation step for calculating the quantization error amount to be diffused into the input image data;
   a control step of controlling said calculation step; and
   a filtering step for performing a filtering process for diffusing the quantization error amount calculated in said calculation step into the peripheral pixels of the subject pixel of the input image data.

14. An image processing method according to claim 13, wherein said calculation step comprises:
   a step of calculating the quantization error in accordance with a difference between the input image data and the output image data for a subject pixel; and
   a step of setting an error amount from within a range of values up to and including the quantization error amount.

15. An image processing method according to claim 14, wherein said step of setting an error amount comprises a step of alternating, for successive pixels, between setting the error amount to be 100% of the quantization error and setting the error amount to be less than 100% of the quantization error.

16. An image processing apparatus, comprising:
   input means for inputting input image data having a first number of levels;
   quantization means for quantizing the input image data input by said input means into output image data having a second number of levels which is smaller than the first number of levels;
   error calculation means for calculating a quantization error between the input image data and the output image data resulting from quantization processing by said quantization means, said quantization error calculated based on peripheral pixels of a subject pixel area error amount which determines an amount of diffusion of the error according to a position of the subject pixel; and
   error diffusion means for diffusing the quantization. error into peripheral pixels of the subject pixel of input image data which have not yet been quantized by said quantization means, said error diffusion means comprising error calculation means for dynamically varying the quantization error amount to be diffused, and periodically calculating the quantization error diffused into the input data, and calculating the error periodically to be a percentage of the quantization error.

17. An image processing apparatus according to claim 16, wherein said error amount calculation means periodically varies the error amount within a range from a first percentage of the quantization error to a second percentage of the quantization error, the first percentage being smaller than the second percentage.

18. An image processing apparatus according to claim 17, wherein the first percentage is 80%.

19. An image processing apparatus according to claim 18, wherein the second percentage is 100%.

20. An image processing apparatus according to claim 17, wherein the second percentage is 100%.

21. An image processing apparatus according to claim 17, wherein said error amount calculation means, for successive pixels, alternates between calculating the error amount to be the first percentage of the respective quantization error and calculating the error amount to be the second percentage of the respective quantization error.

22. An image processing apparatus according to claim 21, wherein the first percentage is 80%.

23. An image processing apparatus according to claim 21, wherein the second percentage is 100%.

24. An image processing apparatus according to claim 16, wherein said error amount calculation means periodically varies the error amount with a first predetermined function having a first period for odd-number block lines in the input image data and with a second predetermined function having a second period for even number block lines in the input image data, wherein each said odd number block line and said even number block line comprises a plurality of blocks of pixels, said blocks having a predetermined size.

25. An image processing apparatus according to claim 24, wherein each said pixel block consists of one pixel.

26. An image processing apparatus according to claim 25, wherein the first period and the second period are each equal to a predetermined period.

27. An image processing apparatus according to claim 26, wherein phases of the first predetermined function and the second predetermined function differ by one half of the predetermined period.

28. An image processing apparatus according to claim 26, wherein the predetermined period is equal to a spacing between adjacent pixels.

29. An image processing apparatus according to claim 26, wherein the predetermined period is less than a spacing between adjacent pixels.

30. An image processing apparatus according to claim 29, wherein the predetermined period is equal to the spacing between pixels divided by $\sqrt{3}$.

31. An image processing apparatus according to claim 29, wherein the first period differs from the second period.

32. An image processing apparatus according to claim 24, wherein each said pixel block comprises a plurality of pixels.

33. An image processing apparatus according to claim 32, wherein the first period and the second period are each equal to a predetermined period.

34. An image processing apparatus according to claim 33, wherein phases of the first predetermined function and the second predetermined function differ by one half of the predetermined period.

35. An image processing apparatus according to claim 33, wherein the predetermined period is equal to a spacing between adjacent pixel blocks.

36. An image processing apparatus according to claim 32, wherein the first period differs from the second period.

37. An image processing apparatus according to claim 16, wherein said error amount calculation means comprises random number generating means for generating a random number signal and means for calculating the error amount in accordance with the random number signal.

38. An image processing apparatus according to claim 16, wherein said error amount calculation means comprises (a) a plurality of error amount calculation circuits, each said error amount calculation circuit outputting a respective signal which periodically is equal to the quantization error and which periodically is equal to a different respective predetermined percentage of the quantization error and (b) means for calculating the error amount in accordance with the signals output by said plurality of error amount calculation circuits.

39. An image processing apparatus according to claim 38, wherein said error amount calculation means comprises four of said error amount calculation circuits, which include a first error amount calculation circuit which outputs a signal periodically varying between 90 and 100% of the quantization error, a second error amount calculation circuit which outputs a signal periodically varying between 40 and 100% of the quantization error, a third error amount calculation circuit which outputs a signal periodically varying between 50 and 100% of the quantization error, and a fourth error amount calculation circuit which outputs a signal periodically varying between 60 and 100% of the quantization error.

40. An error diffusion correction system, comprising:

quantization means for quantizing a subject pixel of input n-level image data into m-level output image data, wherein n>m;

quantization error calculation means for calculating a quantization error arising from a quantization process of said quantization means, said quantization error calculated based on peripheral pixels of a subject pixel area error amount which determines an amount of diffusion of the error according to a position of the subject pixel;

adjusting means for dynamically varying the quantization error calculated by the quantization error calculation means prior to diffusion of the quantization error to peripheral pixels of the subject pixel and for outputting an adjusted quantization error; and diffusion means for diffusing the adjusted quantization error output by said adjusting means, said diffusion means comprising means for diffusing the quantization error to peripheral pixels of the subject pixel, wherein said adjusting means periodically adjusts the quantization error to be a percentage of the quantization error.

41. A system according to claim 40, wherein said adjusting means comprises means for alternating outputting the quantization error in its entirety and outputting a predetermined portion of the quantization error with a period being equal to a separation between pixels.

42. A system according to claim 40, wherein said adjusting means comprises means for alternating outputting the quantization error in its entirety and outputting a predetermined portion of the quantization error with a first period being equal to a distance between neighboring pixels in a line of pixels and with a first phase for even-number lines of pixels in the input n-level image data, and for alternating outputting the quantization error in its entirety and outputting a predetermined portion of the quantization error with a second period equal to the first period and with a second phase which is shifted from the first phase by one half of the first period for odd-number lines of pixels in the input n-level image data.

43. A system according to claim 40, wherein said adjusting means comprises a plurality of means for alternating outputting the quantization error in its entirety and outputting a different respective predetermined portion of the quantization error with a period being equal to a separation between pixels.

44. A system according to claim 40, wherein m=1.

* * * * *

UNITED STATES PATENT AND TRADEMARK OFFICE
CERTIFICATE OF CORRECTION

PATENT NO. : 6,173,081 B1
DATED : January 9, 2001
INVENTOR(S) : Nishikawa

It is certified that error appears in the above-identified patent and that said Letters Patent is hereby corrected as shown below:

Column 7,
Line 63, "shown" should read -- shown in --.

Column 8,
Line 1, "23±α" should read -- 23%±α --.

Column 14,
Line 31, "quantization." should read -- quantization --; and
Line 65, "odd-number " should read -- odd number --.

Signed and Sealed this

Twenty-fifth Day of June, 2002

Attest:

JAMES E. ROGAN
Attesting Officer   Director of the United States Patent and Trademark Office